(12) United States Patent
Reeder et al.

(10) Patent No.: US 6,967,766 B2
(45) Date of Patent: Nov. 22, 2005

(54) ZIGZAG SLAB LASER AMPLIFIER WITH INTEGRAL REFLECTIVE SURFACE AND METHOD

(75) Inventors: Robin A. Reeder, El Segundo, CA (US); Steven C. Matthews, Pacific Palisades, CA (US); Alexander A. Betin, Manhattan Beach, CA (US)

(73) Assignee: Raytheon Company, Waltham, MA (US)

( * ) Notice: Subject to any disclaimer, the term of this patent is extended or adjusted under 35 U.S.C. 154(b) by 328 days.

(21) Appl. No.: 10/425,578

(22) Filed: Apr. 29, 2003

(65) Prior Publication Data

US 2004/0218254 A1 Nov. 4, 2004

(51) Int. Cl.[7] .............................. H01S 3/00; H01S 3/16
(52) U.S. Cl. ....................................... 359/333; 372/41
(58) Field of Search .............................. 359/342, 349, 359/333, 347; 372/41

(56) References Cited

U.S. PATENT DOCUMENTS

| 3,633,126 A | * | 1/1972 | Martin et al. ................. 372/35 |
| 4,902,127 A | * | 2/1990 | Byer et al. .................. 356/28.5 |
| 5,974,061 A |   | 10/1999 | Byren et al. |

FOREIGN PATENT DOCUMENTS

| EP | 0 973 236 A | 1/2000 |
| JP | 2000 164954 A | 6/2000 |
| JP | 2001 326405 A | 11/2001 |

OTHER PUBLICATIONS

W. Koechner in Solid-State Laser Engineering, Second Edition, pp. 389-399.

Coyle D B: Design of a High-Gain Laser Diode-Array Pumped ND:YAG Alternating Precessive Slab Amplifier (APS Amplifier) IEEE Journal of Quantum Electronics, IEEE Inc. New York, US, vol. 27, No. 10, Oct. 1, 1991, pp. 2327-2331, XP000234353 ISSN: 0018-9197.

* cited by examiner

*Primary Examiner*—Mark Hellner
(74) *Attorney, Agent, or Firm*—John E. Gunther; Leonard A. Alkov; Karl A. Vick

(57) ABSTRACT

A solid-state laser beam amplifier with integrated reflective surface. A rectangular slab gain medium receives a first portion of an input laser beam along a first zigzag reflection path within the slab. The gain medium also receives a second portion of the input laser beam that has been reflected from an integral reflective surface such that the two portions traverse the gain medium along complementary zigzag paths. The zigzag paths are defined by total internal reflection of the beam portions as they propagate through the gain medium slab. A similar reflective surface may be positioned relative to the exit end of the gain medium slab, which redirects all of the output beam portions in a parallel direction. The gain medium may be Ytterbium or neodymium doped yttrium aluminum garnet. The gain medium may be formed as a high aspect ratio rectangular slab and may be clad with sapphire. The reflective surfaces may function by total internal reflection or may employ a reflective material, such as a dielectric coating. A section of undoped medium may be applied to the entrance or exit end of the gain medium slab to control angles of incidence and refraction.

46 Claims, 4 Drawing Sheets

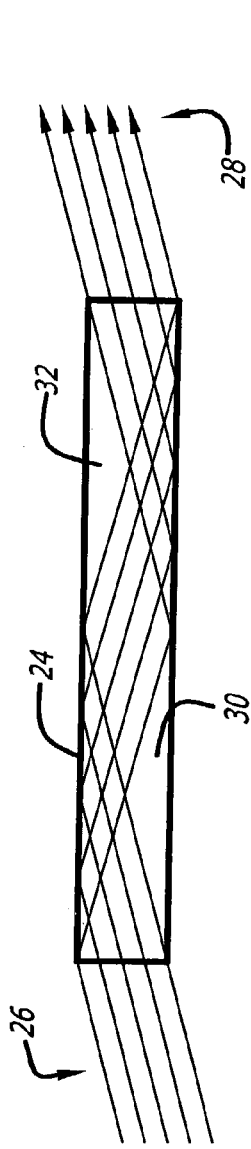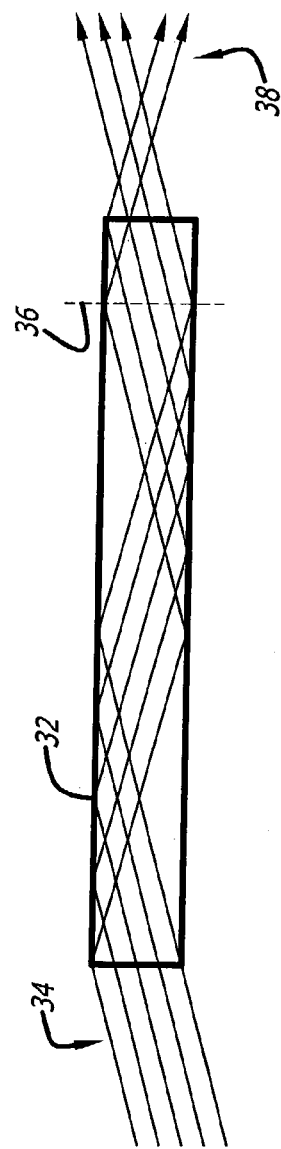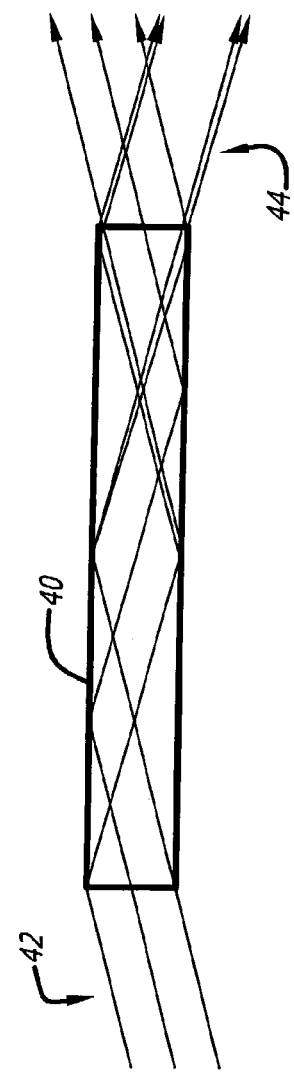
FIG. 3 (Prior Art)
FIG. 4 (Prior Art)
FIG. 5 (Prior Art)

ZIGZAG SLAB LASER AMPLIFIER WITH INTEGRAL REFLECTIVE SURFACE AND METHOD

BACKGROUND OF THE INVENTION

1. Field of the Invention

The present invention relates to lasers. More specifically, the present invention relates to pumplight driven solid-state laser amplifiers that employ rectangular slab geometry.

2. Description of the Related Art

Solid-state lasers employ one or more amplifier stages to achieve a desired output power. Solid-state laser amplifier designs employ a doped-insulator lasing medium that may be driven by high power light emitting diode array pumplights, but can also employ flashlamps or other pumplight technology. The lasing material is typically comprised of a host crystal doped with an ion, such as, for example, ytterbium doped yttrium aluminum garnet (Yb:YAG) or neodymium doped yttrium aluminum garnet (Nd:YAG). Modern slab laser amplifiers are optically pumped by narrow spectral band, high brightness laser diode arrays. The higher brightness levels of such laser diode pump sources allow the high aspect ratio slab to be pumped either through the narrow edges of the slab, in directions generally transverse to the laser beam, or through the narrow ends of the slab in directions generally co-linear with the laser beam. Edge and end pumping of the slab allows the broad side faces to be cooled without constraining the cooling system to also transmit the pumplight beam into the slab, thereby generally simplifying the cooling system design by not requiring the coolant to transmit the pumplight beam. Laser efficiency is improved with a pumplight configuration that results in the optimum absorption and distribution of pumplight energy in the lasing medium.

In each amplifier stage of a laser system, a laser beam from an oscillator or previous amplifier state is directed into the entrance end of a gain medium slab. The driving laser beam is directed through the slab, and a lasing action occurs when the dopant ions release energy to the beam as they revert to their previous stable-low-energy state. A portion of the energy released is converted to light and results in an energy gain in the laser beam traversing the slab. Such lasers operate in both pulsed, and CW modes of operation.

The physical operating characteristics of a solid-state laser present many challenges to designers. Naturally, the process is not 100% efficient; so all designs must deal with residual energy issues. For example, not all of the pumplight energy is coupled to the dopant ions, which results in waste energy in the form of sensible heat and fluorescent energy. Further, not all of the energy delivered to the dopant ions is recovered by the laser beam as actual laser gain. Waste energy that is not radiated out of the slab as fluorescent energy must be conducted out of the slab as sensible heat energy. Slab surface cooling techniques are employed to conduct heat out of the slab, but this results in significant thermal gradients within the slab.

Thermal gradients within the slab are problematic. Thermal gradients result in crystal stress gradients that are known to produce stress induced birefringence. Birefringence results in beam depolarization. Fortunately, the rectangular slab geometry enables designers to maintain an orthogonal relationship between the stress gradient and the beam polarization, which greatly controls the effect of beam depolarization in the presence of slab stress. Another significant problem is thermal lensing, which is caused by the temperature gradient within the slab. Essentially, the slab's index of refraction is temperature dependent, so a gradient of temperatures within the slab results in a gradient of refraction angles of the beam as it passes through the slab. Rectangular slab solid-state lasers employ a 'tophat' beam that has a size and aspect ratio approximately the same shape and size as the entry end of the gain medium. Thermal lensing causes the beam shape to change as it propagates so that is does not continue to conform to the cross section of the gain medium though the slab. The net effect is that the beam is diffused, and sometimes focused, as the various light rays pass through different temperature regions within the slab. Beam quality is compromised. Further, the beam tends to over fill or under fill the slab. As a result, optical distortions are produced, beam quality is degraded, and general system performance is reduced as well.

The thermal lensing in the slab is cylindrical and can be compensated by propagating the beam in a zigzag path between the broad slab surfaces. The zigzag path causes all of the light rays to pass through all of the temperature gradients within the slab, netting out the thermal lens effect. However, a zigzag path through the slab also defines certain shadow zones where the laser beam does not reach dopant ions that have been elevated to a metastable state by the pumplight energy. This results in both reduced laser gain extraction efficiency and increased waste energy that must be dealt with. Multiple passes of the laser beam through the slab have been used in the prior art to more completely fill the slab, but the extended path that the laser beam must traverse results in unwanted beam expansion, reduced beam quality, and a generally more complex system design. Beam expansion implies that the entrance end beam aspect ratio must either be initially under filled to allow for the beam expansion as it propagates, or that the expanded beam will be clipped and produce stray rays that result in excessive internal reflections and feedback. Stray energy and feedback reduce beam quality.

Thus there is a need in the art for a laser amplifier apparatus and method that provides more complete fill of the slab gain medium, increases available power extraction, simplifies system design, and improves systems efficiency and performance.

SUMMARY OF THE INVENTION

The need in the art is addressed by the apparatus and methods of the present invention. Generally, a laser beam amplifier apparatus is taught which includes a rectangular slab gain medium that has an entrance end aligned to receive a first portion of an input laser beam along a first zigzag reflection path within the slab. The apparatus also includes a reflective surface positioned to reflect a second portion of the input laser beam into the entrance end along a second zigzag reflection path within the slab.

In a specific embodiment of the apparatus, the slab further has an exit end through which the first and second portions of the laser beam exit the slab. A second reflective surface is positioned to reflect at least a fraction of either the first portion or the second portion of the laser beam substantially parallel to the other portion of the laser beam after exiting the exit end. In another embodiment, the gain medium is a crystal medium doped with an ion. The gain medium may be yttrium aluminum garnet, doped with either ytterbium ions or neodymium ions. In a specific embodiment, laser beam makes a single pass through the amplifier.

In another specific embodiment, the slab is formed in a high aspect ratio rectangular geometry. In a particular improvement, the laser beam transverse aspect ratio is approximately twice that of the entrance end aspect ratio geometry. In certain applications, the slab has cladding on at least a first broad surface. The cladding may be sapphire. In a specific embodiment, the reflective surface is formed integral with the cladding on a surface that extends beyond the slab. The reflective surface may function by total internal reflection. Also, the reflective surface may be a surface formed by material deposition. In a particular embodiment, the reflective surface material is a dielectric coating.

In a refinement of the apparatus, the amplifier further includes a section of undoped medium disposed about the entrance end such that the laser beam passes there through prior to entering the entrance end. In a refinement, the reflective surface is formed on a surface of the section of undoped medium. In another specific embodiment, the undoped medium has an entrance surface angled to yield a beam refraction angle allowing the laser beam angle of incidence thereon to be substantially parallel to the longitudinal axis of the slab. In another specific embodiment, the amplifier further includes a beam conjugator positioned to conjugate the first and second portions of the laser beam after exiting the exit end, thereby establishing a substantially flat phase front.

In a specific embodiment of the amplifier apparatus, the first and section portions of the beam follow zigzag paths that are opposite and complimentary to one another, thereby saturating the interior space of the slab with the laser beam rays. In a particular application, an array of pumplights is positioned to excite ions in the gain medium to a meta-stable state to effect the lasing operation and gain.

The present invention also teaches a method of amplifying a laser beam in a rectangular slab gain medium amplifier using a reflective surface positioned adjacent to an entrance end of the slab. The method includes the steps of directing a first portion of the laser beam into the entrance end, thereby establishing a first zigzag reflection path through the slab, and reflecting a second portion of the laser beam off of the reflective surface and into the entrance end, thereby establishing a second zigzag reflection path through the slab.

In a specific embodiment of the method, the slab has an exit end through which the first and second portions of the laser beam exit the slab, and a second reflective surface is positioned adjacent to the exit end. The method then includes the further step of reflecting at least a fraction of one of the first portion or the second portion of the laser beam off of the second reflective surface and in a direction substantially parallel to the other of the first portion or the second portion of the laser beam after exiting the exit end. In one embodiment, the laser beam makes a single pass through the amplifier.

In another specific embodiment, the slab is formed in high aspect ratio rectangular geometry. In a refinement, the laser beam transverse aspect ratio is approximately twice that of the entrance end aspect ratio geometry. The slab may have cladding on at least a first broad surface. Then, the reflective surface may be formed integral with the cladding. The reflective surface may function by total internal reflection. In another embodiment, the reflective surface is a surface formed by material deposition.

In a specific embodiment a reflective surface/mirror is positioned away from the slab entrance such that two portions of the beam are created and launched into the slab using a relay imaging telescope. At the exit end of the slab these two portions of the transmitted beam co-aligned together using another relay imaging telescope and a reflective surface/mirror positioned at the image plane.

In a specific refinement of the methods, the step of passing the laser beam through a section of undoped medium disposed about the entrance end prior to entering the entrance end is added. In a further refinement, the reflective surface is formed on a surface of the undoped medium. In another refinement, the undoped medium has an entrance surface angled. A further step of refracting the laser beam through the angled surface, thereby allowing the laser beam angle of incidence thereon to be substantially parallel to the longitudinal axis of the slab, is added. In a specific embodiment, the method includes the further step of conjugating the first and second portions of the laser beam after exiting the amplifier, thereby establishing a substantially flat phase front in the resultant beam.

BRIEF DESCRIPTION OF THE DRAWINGS

FIG. 3 is a side view of a solid-state slab laser amplifier according to the prior art.

FIG. 4 is a side view of a solid-state slab laser amplifier according to the prior art.

FIG. 5 is a side view of a solid-state slab laser amplifier according to the prior art.

DESCRIPTION OF THE INVENTION

Figure 1:
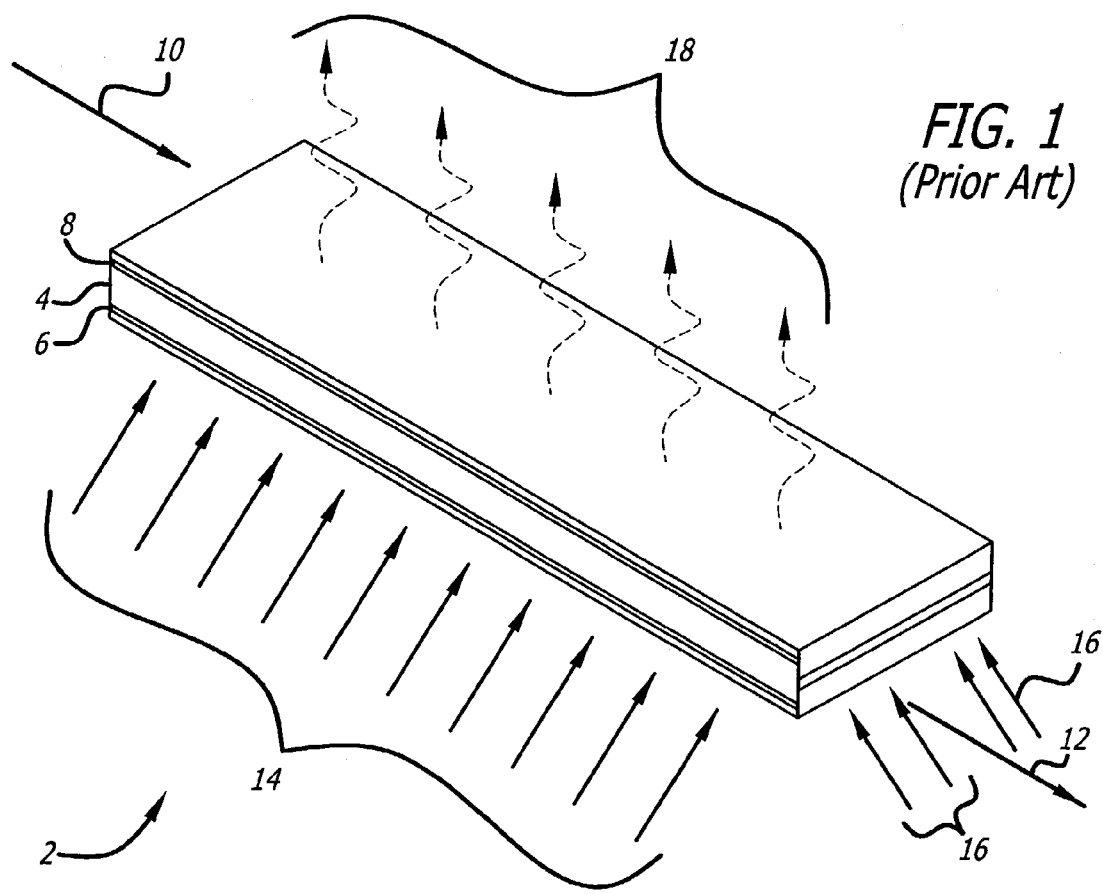
FIG. 1 is a functional block diagram of a solid-state laser amplifier slab according to the prior art.

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

The present invention uses a relatively larger laser beam and an integrated reflector to produce two beams at the input to the gain medium of an amplifier stage so that there is better fill of the amplifier and there are no problems with feedback into other sections of the amplifier chain.

In the present invention, a zigzag slab with integral mirror surface solves many of the problems associated with prior art zigzag propagation techniques. This is particulalry beneficial when used in a folded, two-pass phase conjugate master oscillator/power amplifier configuration, where optical feedback into an oscillator is very detrimental. The present invention addresses problems with prior art zigzag slab amplifiers when applied to laser systems operating with reduced numerical apertures. Particular problems solved are shadow zones where power cannot be extracted by a single beam.

The teachings of the present invention are applicable in various laser applications, including high power solid-state lasers as used in a number of military and commercial applications. Such applications require high extraction efficiency and good control of stray laser power. Military applications include rangefinders, designators, active tracking illuminators, beacons for atmospheric wavefront sensing, laser radar, infrared countermeasures, and directed energy weapons. Commercial applications include industrial materials processing, long-range remote sensing, and scientific applications. This skilled in the art will certainly realize and develop further applications where the teachings of the present invention are advantageous.

The prior art teaches an approach to scaling solid-state lasers to higher power by using a high aspect ratio rectangular slab geometry for the solid-state laser gain medium, as described by W. Koechner in *Solid-State Laser Engineering*, Second Edition, pp. 389–399, the contents of which are hereby incorporated by reference thereto. Additional related teachings, sharing a common assignee with the present invention, have also been disclosed. These include U.S. Pat. No. 5,974,061 to Byren et al. for LASER PUMP CAVITY APPARATUS WITH IMPROVED THERMAL LENSING CONTROL, COOLING, AND FRACTURE STRENGTH AND METHOD and pending U.S. patent application Ser. No. 10/202,752 filed on Jul. 25, 2002 to Betin et al. for MULTI-JET IMPINGEMENT COOLED SLAB LASER PUMPHEAD AND METHOD, the contents of both are hereby incorporated by reference thereto.

Reference is directed to FIG. 1, which illustrates a slab employing such geometry in a laser amplifier gain stage 2. The gain medium 4 is formed in high aspect ratio geometry and is clad top and bottom with layers of cladding 6, 8. Pumplight energy is directed into the gain medium 4 along the ends 16 or edges 14. Sensible heat is released from the broad surfaces 18, thus facilitating cooling of the slab 4 during operation. An input laser beam 10 experiences an increase in beam energy as it propagates through the slab 4 and then exits the slab 4 at the opposite end as an output beam 12. An essential benefit of this design is that it provides a large cooling surface relative to prior art cylindrical rod gain stages of equal volume. The heat flow within the slab 4 is essentially one-dimensional and is spread over a large area, therefore the temperature gradient is small relative to the rod design and is also one-dimensional. Because the stress within the slab 4 follows the temperature gradient, the stress-induced birefringence tends to be along the normal to the broad slab surfaces so that light polarized in this direction or an orthogonal direction will not be depolarized as it propagates through the slab 4.

Figure 2:
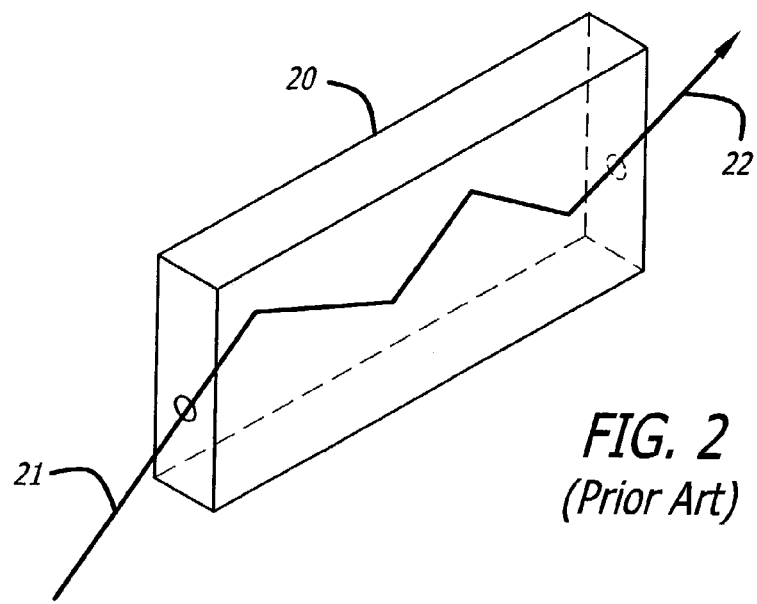
FIG. 2 is a perspective drawing of a solid-state slab laser amplifier medium according to the prior art.

The one-dimensional thermal lensing, due to top and bottom cooling of a slab gain medium, is often strong enough that passing a laser beam straight through the slab results in poor filling or even internal focusing. Thermal lensing in a slab amplifier can be corrected to a large extent by how the beam propagates through the slab. In prior art laser slabs, as shown in FIG. 1, the thermal lensing in the slab can be compensated by propagating the beam in a zigzag path between the broad side surfaces. The zigzag slab laser was disclosed by W. S. Martin and J. P. Chernoch in U.S. Pat. No. 3,633,126 for MULTIPLE INTERNAL REFLECTION FACE-PUMPED LASER, the contents of which are hereby incorporated by reference thereto. Reference is directed to FIG. 2, which illustrates a prior art slab design employing a zigzag laser beam path. The beam 21 enters the slab 20 and propagates along a zigzag reflection path as illustrated. The beam exits 22 the slab 20 at the opposite end.

Employing a zigzag beam path also introduces certain problems that result in less than optimum laser efficiency. Reference is directed to FIG. 3, which is a side view of a prior art amplifier gain medium 24 employing a zigzag beam path. A laser beam enters the entrance end of the slab 24, and is represented by the plural light rays 26. In prior art designs, the size and aspect ratio of the beam is substantially the same as the size and aspect ratio of the entrance end of the slab 24. Thus, the beam fills the cross section of the slab at the entrance end. The entrance beam 26 is angled to reflect within the slab 24 in a zigzag fashion until it exits the slab at the opposite end 28. The reflections within the slab occur due to total internal reflection of the laser beam. Total internal reflection occurs according to Snell's law and the critical angle is defined by the indices of refraction of the gain medium and the adjacent material. Those skilled in the art are familiar with the principles of total internal reflection.

While the zigzag path illustrated in FIG. 3 does overcome most of the problems related to thermal lensing, the zigzag path in the slab 24 also results in certain shadow regions 30 and 32 where the beam does not extract energy in the excited dopant ions. The failure of this approach to extract energy from the shadow regions 30 and 32 results in reduced energy efficiency of the amplifier and the creation of a greater amount of waste energy. These problems can be partially alleviated if the system employs a double pass beam. In such a system, the beam is returned into the slab on a second pass in such a way that the unaccessed portions on the first pass are accessed on the second pass. However, this poses a problem if the amplifier is not underfilled at the entrance end, since beam growth results in stray beams that can cause feedback or even oscillation in a phased conjugated amplifier chain. Underfilled beams will be more fully discussed hereinafter.

It should be noted that the illustration in FIG. 3 is a somewhat idealized view of the prior art. In typical applications, there would be a greater number of reflections and a longer zigzag path that would define a greater number of shadow regions. Also, the length of the slab in FIG. 3 has been exactly chosen such that every light ray exits 28 the slab 24 in parallel. Therefore, no stray rays exit the slab 24 off of the main beam axis. Also, the various light rays experience no diffraction from parallel and thus no beam growth as they propagate through the slab. In practice, neither of these idealized scenarios is realized.

Reference is directed to FIG. 4, which is a side view of a prior art slab amplifier. FIG. 4 illustrates the problem in the prior art where the slab 32 length is too long or too short as compared to the geometry of the laser beam zigzag path. The laser beam enters 34 the slab 32 and propagates along a zigzag path. At position 36, all of the rays are parallel and fall within a cross sectional area the same size as the cross section of the slab 32. However, the slab is longer than optimum, so a portion of the rays experience an additional reflection so the beam that exits the slab has a fraction of the rays that do not align with the main laser beam. This effect causes problems that are configuration dependent. It could be that the stray rays cause feedback to another part of the system, or that it simply results in a loss of power and information. In particular, a loss of phase information is significant because phase information is important for phase conjugation.

Reference is directed to FIG. 5, which is a side view of a prior art slab amplifier. FIG. 5 illustrates the problems related to laser beam diffusion, diffraction and beam growth generally. An ideal laser beam would be comprised of parallel rays and operate in a system devoid of diffractive influences. In practice, however, laser beams experience some degree of beam growth as they propagate. In FIG. 5, the beam 42 enters the slab 40 at the entrance end and gradually grows in size as it propagates along a zigzag path. At the exit end of the slab, the beam 44 has grown in size such that the outer edges of the rays are beyond the size of the exit aperture. Thus, the edges of the beam experience an extra reflection at the exit end. This results in 'clipping' of the beam, which produces stray rays that are off of the main beam axis. In addition, this effect results in either feedback or loss of power and information. A prior art approach to dealing with this issue is to reduce the size of the entrance beam 42 so that the beam growth never causes the exit beam 44 to exceed the exit aperture size of the slab 40. However, this necessarily implies that the entrance end of the slab will be underfilled. Underfilled portions of the slab produce the same problems discussed with respect to the shadow regions.

Figure 6:
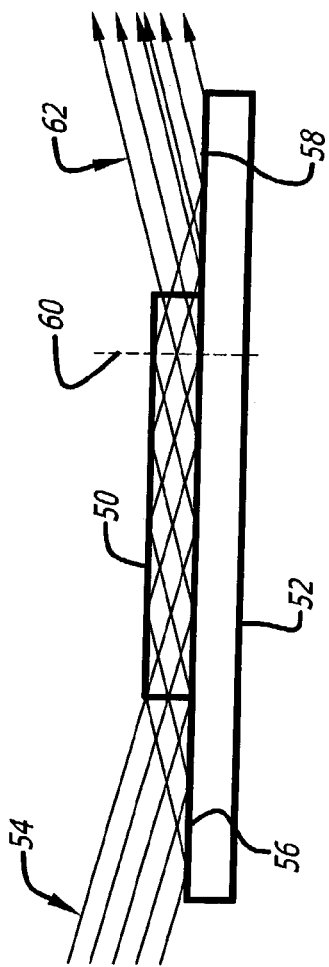
FIG. 6 is a side view of a solid-state slab laser amplifier according to an illustrative embodiment of the present invention.

The present invention overcomes the problems in the prior art by using an integral reflector to divide the incoming beam into two portions that follow two separate zigzag paths thorough the slab amplifier. The geometry of the slab is configured, or a second reflector at the exit end of the slab may be used, so that a single beam is reconstructed at the exit end of the slab. Reference is directed to FIG. 6, which is an illustrative embodiment of the present invention. The embodiment in FIG. 6 utilizes a slab amplifier 50 and a lower cladding layer 52. The cladding may be formed from sapphire, for example, and may be diffusion bonded to the slab 50. The slab 50 may be yttrium aluminum garnet that is doped with either ytterbium or neodymium ions. Other materials known to those skilled in the art could be used as well. An input laser beam 54 is directed at the entrance end of the slab 50 and at a section of the cladding 52, which extends beyond the entrance end of the slab 50. The size of the input beam is approximately twice as large as the entrance end of the slab. And accordingly, the aspect ratio of the input beam is approximately one-half that of the slab aspect ratio at the entrance end. This relationship allows about one half of the input beam to reflect from the cladding about region 56 and one-half of the beam to enter the entrance end of the slab 50 directly. Note that the reflection from the cladding 52 at region 56 may be according to the principle of total internal reflection or by virtue of a coating or mirror application to region 56. Dielectric coatings, such as magnesium fluoride are useful for this purpose.

In FIG. 6, the directly entering portion of the input laser beam 54 follows a first zigzag propagation path through the slab 50. The reflected portion of the input laser beam 54 follows a second, different, zigzag propagation path through the slab 50. Both propagation paths are constrained by total internal reflection of the laser beam light rays within the slab medium. The two paths may be opposite and complimentary to one another so that every portion of the internal volume of the slab 50 is saturated with laser beam light rays, and thus all of the excited dopant ions are enabled to potentially relinquish their energy to the laser beam. This approach maximizes energy transfer efficiency.

In FIG. 6, the ideal length of the slab 50 exists at position 60. At position 60, all of the rays in both portions of the laser beam experience the same number of internal reflections and emerge as singular bundles of light rays. However, the illustrative embodiment in FIG. 6 demonstrates why the dimensions of the slab are not critical in the present invention. The cladding 52 extends beyond the exit end of the slab 50 to form another reflective surface in the area of region 58. This region produces an addition reflection of all those rays of both of the aforementioned first and second portions of the laser beam such that all of the rays of the output laser beam are substantially parallel to one another. The output beam 62 is always a single beam, regardless of the exact length of the slab 50, with no abnormalities other than that there is some mixing. A phase conjugator can be added (not shown) to correct the phase front of the output beam 62. Those skilled in the art are familiar with the principles, uses and technology related to phase conjugators.

The illustrative embodiment in FIG. 6 thus eliminates all the problems in the prior art that were described herein before. The slab is completely filled with no shadow regions lacking extraction. There is no feedback from off angle beams at the exit end of the slab. There is no loss of power or information. And, there is no need to partially fill the entrance end of the slab to allow for beam growth.

Figure 7:
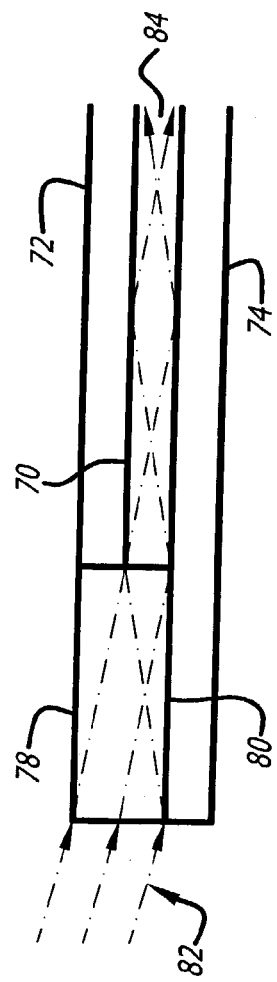
FIG. 7 is a side view of a solid-state slab laser amplifier according to an illustrative embodiment of the present invention.

FIG. 7 depicts a partial side view of a slab amplifier according to an illustrative embodiment of the present invention. The gain medium slab 70 is disposed between a top cladding material 72 and a bottom cladding material 74. The layers may be diffusion bonded together. The bottom cladding material 74 extends beyond the entrance end of the gain medium slab 70 to form a reflective region 80. A section of undoped medium 78 is positioned adjacent to the entrance end of gain medium slab 70 and the extended region 80 of bottom cladding layer 74. In operation the input laser beam 82 impinges the section of undoped medium 78 along a predetermined line of angular acceptance. The acceptance angle is chosen to be large enough for allowing pump light input through the same surface, but not so large that parasitic effects become an issue. The input beam 82 refracts as it passes into the undoped medium 78. A portion of the beam 82 reflects from the extended region 80 of the bottom cladding layer 74. The remaining portion of the beam 82 enters the entrance end of gain medium slab 70. Reflection may be via total internal reflection or through use of a reflective material layer applied to either the bottom cladding 74 or the undoped medium 78.

Propagation through the gain medium slab 84 is via total internal reflection in the illustrative embodiment. A typical cladding material for a gain medium of Nd:YAG or Yb:YAG is sapphire, giving an internal acceptance half-angle of about 15 degrees. The undoped medium may be undoped YAG (no neodymium or ytterbium impurity). The reflection of the input is via total internal reflection off the cladding layers. Pumplight energy (not shown) can enter the gain medium at angles between zero and twelve degrees, or through the edges of the gain medium slab. Only one end of the slab is shown in the FIG. 7. The other end can be similarly arranged such that the beam is diverted up or down, depending on the requirements of the system construction.

Figure 8:
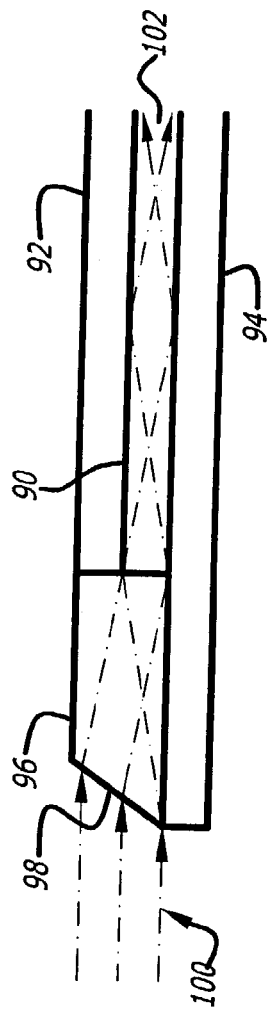
FIG. 8 is a side view of a solid-state slab laser amplifier according to an illustrative embodiment of the present invention.

Reference is directed to FIG. 8, which is a partial side view of a laser amplifier in an illustrative embodiment of the present invention. In FIG. 8, the input beam 100 enters the system in-line and parallel with the gain medium slab 90. A section of undoped medium 96 has a front surface 98 that is angled to compensate for the angle of refraction of the beam 100 as it passes through the interface. The angled surface 98 also establishes the angle of incidence of a portion of the beam onto the reflective region of the extended bottom cladding layer 94. The other portion of the beam 100 enters the gain medium slab 90 directly. A top cladding layer 92 completes the assembly. The two portions of the input beam propagated through the gain medium slab 90 along complimentary zigzag paths 102. The parallel beam approach of this illustrative embodiment provides an advantage in packaging and system alignment.

An additional advantage of the present invention, apparent in FIG. 7 and FIG. 8, is that the intensity (power per unit area) at the input/exit faces of the slab is reduced from that in the gain medium by roughly a factor of two, depending on the geometry employed. This allows the amplifier to be more efficient because it can be made smaller, and hence the intensity relative to saturation intensity is higher, producing higher extraction efficiency. This benefit would also apply to pulsed operation, where fluence (energy per unit area) is a greater concern than intensity. Stated another way, the transverse aspect ratio of the beam is roughly half that of the slab. For example, a 5:1 aspect ratio of the beam is used into a 10:1 aspect ratio slab. Also note that though particular angles through the slab are shown which are appropriate to a YAG/sapphire interface, the teachings of the present invention are equally applicable for other materials with shallower or steeper internal angles.

Figure 9:
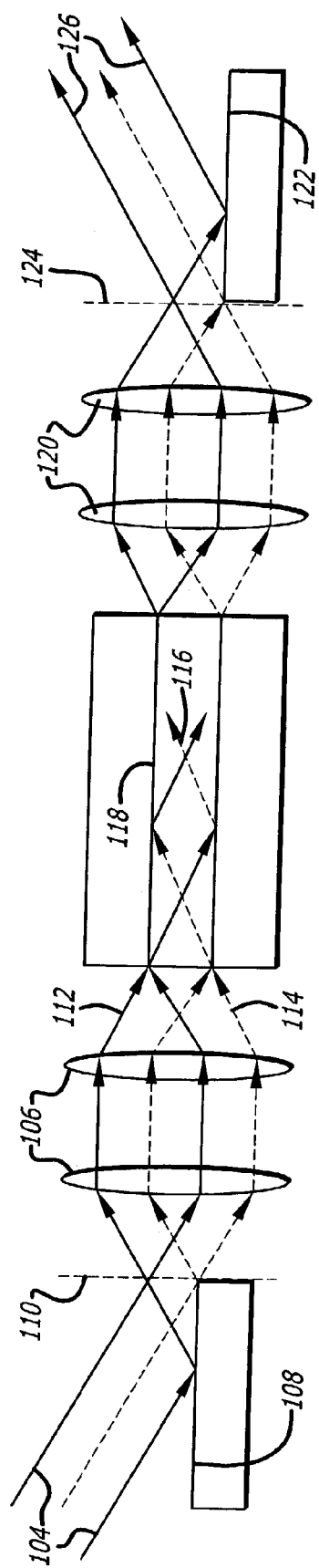
FIG. 9 is a side view of a solid-state slab laser amplifier according to an illustrative embodiment of the present invention.

Reference is directed to FIG. 9, which is a partial side view of a laser amplifier in an illustrative embodiment of the present invention. In FIG. 9, the input beam 104 enters the system using a relay imaging telescope 106 in such a way that the reflective surface/mirror 108 is positioned in the image plane 110 to form two portions 112, 114 of the beam that follow two separate but complementary, zigzag paths 116 through the slab 118. A similar relay imaging telescope 120 and a reflective surface/mirror 122, in the image plane 124 are positioned on the exit side of the slab, such that the single beam 126 is reconstructed after passing the amplifier. This arrangement has all the benefits of the arrangements shown in FIGS. 6, 7 and 8. The particular advantage of this arrangement is that the whole angle of view (about two times larger than in those shown in FIGS. 6, 7 and 8) of the pump guiding region of the slab is accessible for the end pumped light. Also, the fabrication of such a slab may be somewhat easier.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. A laser beam amplifier comprising:
    a rectangular slab gain medium having an entrance end aligned to receive a first portion of an input laser beam along a first zigzag reflection path within said slab, wherein said slab has cladding on at least a first broad surface thereof and
    a reflective surface positioned to:reflect a second portion of said input laser beam into said entrance end and along a second zigzag reflection path within said slab.

2. The apparatus of claim 1 wherein said slab has an exit end through which said first and second portions of said laser beam exit said slab, further comprising:
    a second reflective surface positioned to reflect at least a fraction of one of said first portion or said second portion of said laser beam substantially parallel to the other of said first portion or said second portion of said laser beam after exiting said exit end.

3. The apparatus of claim 1 wherein said gain medium is a crystal medium doped with an ion.

4. The apparatus of claim 1 wherein said gain medium is yttrium aluminum garnet doped with either ytterbium ions or neodymium ions.

5. The apparatus of claim 1 wherein the laser beam makes a single pass through the amplifier.

6. The apparatus of claim 1 wherein said slab is formed in high aspect ratio rectangular geometry.

7. The apparatus of claim 6 wherein the laser beam transverse aspect ratio is approximately twice that of said entrance end aspect ratio geometry.

8. The apparatus of claim 1 wherein said cladding is sapphire.

9. The apparatus of claim 1 wherein said reflective surface is formed integral with said cladding on a surface that extends beyond said slab.

10. The apparatus of claim 1 wherein said reflective surface functions by total internal reflection.

11. The apparatus of claim 1 wherein said reflective surface is a surface formed by material deposition.

12. The apparatus of claim 11 wherein said material is a dielectric coating.

13. The apparatus of claim 1, further comprising a section of undoped medium disposed about said entrance end such that the laser beam passes therethrough prior to entering said entrance end.

14. The apparatus of claim 13 wherein said reflective surface is formed on a surface of said section of undoped medium.

15. The apparatus of claim 13 wherein said undoped medium has an entrance surface angled to yield a beam refraction angle allowing the laser beam angle of incidence thereon to be substantially parallel to the longitudinal axis of said slab.

16. The apparatus of claim 1, further comprising a beam conjugator positioned to conjugate said first and second portions of said laser beam after exiting an exit end, thereby establishing a substantially flat phase front.

17. The apparatus of claim 1 wherein said first and section portions of said beam follow zigzag paths that are opposite and complimentary to one another, thereby saturating the interior space of said slab with the laser beam rays.

18. The apparatus of claim 1, further comprising:
    an array of pumplights positioned to excite ions in said gain medium to a metastable state.

19. The apparatus of claim 1 wherein the slab amplifier and cladding layer are joined by diffusion bonding.

20. A method of amplifying a laser beam in a rectangular slab gain medium amplifier using a reflective surface positioned adjacent to an entrance end of the slab, said slab having cladding on at least a first broad surface of said medium, said method comprising the steps of:
    directing a first portion of the laser beam into the entrance end, thereby establishing a first zigzag reflection path through the slab and
    reflecting a second portion of the laser beam off of the reflective surface and into the entrance end, thereby establishing a second zigzag reflection path through the slab.

21. The method of claim 20 wherein the slab has an exit end through which said first and second portions of said laser beam exit the slab, and a second reflective surface positioned adjacent to the exit end, further comprising the step of:
    reflecting at least a fraction of one of said first portion or said second portion of the laser beam off of the second reflective surface and in a direction substantially parallel to the other of said first portion or said second portion of said laser beam after exiting said exit end.

22. The method of claim 20 wherein the laser beam makes a single pass through the amplifier.

23. The method of claim 20 wherein the slab is formed in high aspect ratio rectangular geometry.

24. The method of claim 23 wherein the laser beam transverse aspect ratio is approximately twice that of said entrance end aspect ratio geometry.

25. The method of claim 20 wherein the reflective surface is formed integral with said cladding.

26. The method of claim 20 wherein the reflective surface functions by total internal reflection.

27. The method of claim 20 wherein the reflective surface is a surface formed by material deposition.

28. The method of claim 20 further comprising the step of:
passing the laser beam through a section of undoped medium disposed about the entrance end prior to entering the entrance end.

29. The method of claim 28 wherein the reflective surface is formed on a surface of said undoped medium.

30. The method of claim 28 wherein said undoped medium has an entrance surface angled, further comprising the step of:
refracting the laser beam through the angled surface, thereby allowing the laser beam angle of incidence thereon to be substantially parallel to the longitudinal axis of the slab.

31. The method of claim 20 further comprising the step of:
conjugating said first and second portions of the laser beam after exiting the amplifier, thereby establishing a substantially flat phase front in the resultant beam.

32. A method of amplifying a laser beam in a rectangular slab gain medium amplifier using a reflective surface positioned at the image plane of a relay telescope on the entrance end of the slab comprising the steps of:
directing a first portion of the laser beam into the entrance end, thereby establishing a first zigzag reflection path through the slab and
reflecting a second portion of the laser beam off of the reflective surface and into the entrance end, thereby establishing a second zigzag reflection path through the slab.

33. The method of claim 32 wherein the slab has an exit end through which said first and second portions of said laser beam exit the slab, and a second reflective surface positioned at the image plane of a relay telescope, further comprising the step of:
reflecting at least a fraction of one of said first portion or said second portion of the laser beam off of the second reflective surface and in a direction substantially parallel to the other of said first portion or said second portion of said laser beam after exiting said exit end.

34. The method of claim 32 wherein the laser beam makes a single pass through the amplifier.

35. The method of claim 32 wherein the slab is formed in high aspect ratio rectangular geometry.

36. The method of claim 35 wherein the laser beam transverse aspect ratio is approximately twice that of said entrance end aspect ratio geometry.

37. The method of claim 32 wherein the slab has cladding on broad surfaces.

38. The method of claim 32 wherein the reflective surface is a mirror.

39. The method of claim 32 further comprising the step of:
conjugating said first and second portions of the laser beam after exiting the amplifier, thereby establishing a substantially flat phase front in the resultant beam.

40. A laser beam amplifier comprising:
a rectangular slab gain medium having an entrance end aligned to receive a first portion of an input laser beam along a first zigzag reflection path within said slab;
a reflective surface positioned to reflect a second portion of said input laser beam into said entrance end and along a second zigzag reflection path within said slab; and
a beam conjugator positioned to conjugate said first and second portions of said laser beam after exiting an exit end, thereby establishing a substantially flat phase front.

41. A method of amplifying a laser beam in a rectangular slab gain medium amplifier using a reflective surface positioned adjacent to an entrance end of the slab comprising the steps of:
directing a first portion of the laser beam into the entrance end, thereby establishing a first zigzag reflection path through the slab;
reflecting a second portion of the laser beam off of the reflective surface and into the entrance end, thereby establishing a second zigzag reflection path through the slab; and
conjugating said first and second portions of the laser beam after exiting the amplifier, thereby establishing a substantially flat phase front in the resultant beam.

42. A laser beam amplifier comprising:
a rectangular slab gain medium having a longitudinal axis and a broad surface in coaxial alignment therewith, an entrance end disposed orthogonally with respect to said broad surface and aligned to receive a first portion of an input laser beam along a first zigzag reflection path within said slab and
a reflective surface positioned to reflect a second portion of said input laser beam into said entrance end and along a second zigzag reflection path within said slab.

43. The apparatus of claim 42 wherein said slab has an exit end through which said first and second portions of said laser beam exit said slab, said exit end being parallel to said entrance end and said apparatus further comprising:
a second reflective surface positioned to reflect at least a fraction of one of said first portion or said second portion of said laser beam substantially parallel to the other of said first portion or said second portion of said laser beam after exiting said exit end.

44. A laser beam amplifier comprising:
a rectangular slab gain medium having a longitudinal axis and a broad surface in coaxial alignment therewith, an entrance end aligned to receive a first portion of an input laser beam along a first zigzag reflection path within said slab and
a reflective surface disposed parallel to said broad surface to reflect a second portion of said input laser beam into said entrance end and along a second zigzag reflection path within said slab.

45. The apparatus of claim 44 wherein said slab has an exit end through which said first and second portions of said laser beam exit said slab, said apparatus further comprising:
a second reflective surface disposed parallel to said broad surface to reflect at least a fraction of one of said first portion or said second portion of said, laser beam substantially parallel to the other of said first portion or said second portion of said laser beam after exiting said exit end.

46. The invention of claim 45 wherein said first and second reflective surfaces are integrated.

* * * * *